(12) United States Patent
Park et al.

(10) Patent No.: US 11,934,604 B2
(45) Date of Patent: Mar. 19, 2024

(54) TOUCH DISPLAY DEVICE

(71) Applicant: LG Display Co., Ltd., Seoul (KR)

(72) Inventors: YongChan Park, Paju-si (KR); HwiDeuk Lee, Paju-si (KR); Yangsik Lee, Paju-si (KR); Hyunsuk Cho, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 87 days.

(21) Appl. No.: 17/494,596

(22) Filed: Oct. 5, 2021

(65) Prior Publication Data

US 2022/0206651 A1 Jun. 30, 2022

(30) Foreign Application Priority Data

Dec. 30, 2020 (KR) ........................ 10-2020-0187760

(51) Int. Cl.
 *G06F 3/041* (2006.01)
(52) U.S. Cl.
 CPC ........ *G06F 3/04164* (2019.05); *G06F 3/0412* (2013.01)

(58) Field of Classification Search
 None
 See application file for complete search history.

(56) References Cited

U.S. PATENT DOCUMENTS 10,705,367 B2 * 7/2020 Wang .................... G06F 3/0412
2016/0291758 A1 10/2016 Du et al.
2019/0235294 A1 8/2019 Wang et al.

* cited by examiner

*Primary Examiner* — Brian M Butcher
(74) *Attorney, Agent, or Firm* — Seed IP Law Group LLP

(57) ABSTRACT

Embodiments of the present disclosure are related to a touch display device, as a plurality of first line parts disposed on a first sensor layer and a plurality of second line parts disposed on a second sensor layer are alternated to make a touch line, at least a portion of different touch lines can be disposed to be overlapped each other, thus a plurality of touch lines can be disposed while reducing or minimizing a reduction of an aperture ratio or a transmittance of a subpixel due to an arrangement of the touch line. Accordingly, a touch sensitivity can be enhanced by further disposing touch electrodes, or the touch display device having a large area with many channels can be implemented easily by further disposing touch lines.

19 Claims, 14 Drawing Sheets

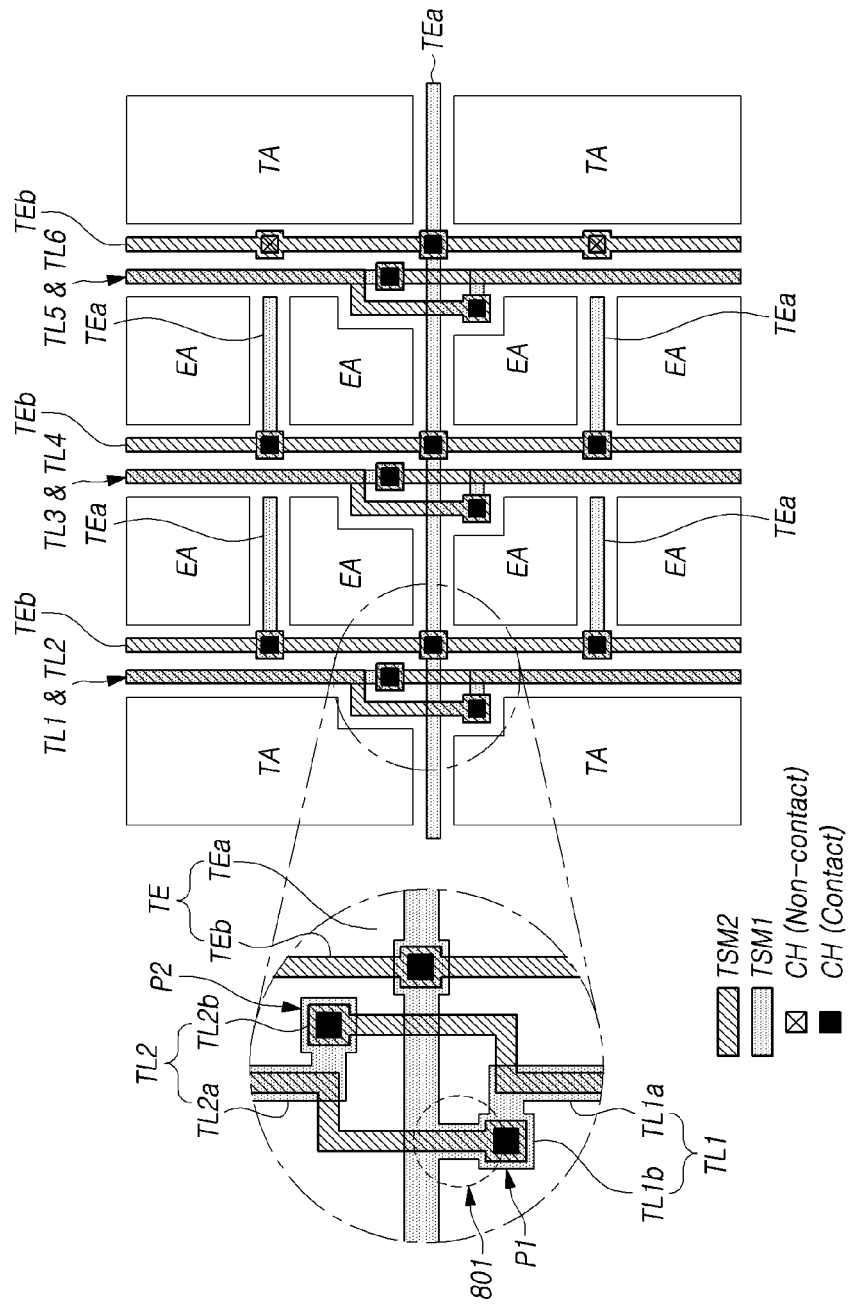

TOUCH DISPLAY DEVICE

CROSS REFERENCE TO RELATED APPLICATION

This application claims priority from Korean Patent Application No. 10-2020-0187760, filed on Dec. 30, 2020, which is hereby incorporated by reference for all purposes as if fully set forth herein.

BACKGROUND

Technical Field

Embodiments of the present disclosure are related to a touch display device.

Description of the Related Art

The growth of the information society leads to increased demand for display devices to display images and use of various types of display devices, such as liquid crystal display devices, organic light emitting display devices, etc.

The display devices can recognize a touch by a finger or a pen of a user touched on a display panel for providing various functions to the user. The display devices can perform an input process for driving the display devices based on the recognized touch.

The display devices can comprise a plurality of touch electrode embedded in the display panel, or disposed on the display panel. The display devices can comprise a plurality of touch lines supplying a touch driving signal to the touch electrode.

The plurality of touch lines can be disposed on a non-active area of the display panel and be electrically connected to the touch electrode. Alternatively, the plurality of touch lines can be disposed on an active area of the display panel and be electrically connected to the touch electrode.

BRIEF SUMMARY

However, the inventors of the present disclosure have recognized that there is a problem that an aperture ratio or a transmittance of a subpixel can be reduced due to the plurality of touch electrodes and the plurality of touch lines disposed on the active area of the display panel.

Embodiments of the present disclosure can provide methods that are capable of disposing a touch electrode and a touch line while reducing or minimizing a reduction of an aperture ratio or a transmittance of a subpixel disposed in a display panel.

Embodiments of the present disclosure can provide methods that are capable of enhancing a touch sensitivity by an increase of an area of the touch electrode disposed in the display panel, or implementing a touch display device having a large area by an increase of the number of the touch line.

In an aspect, embodiments of the present disclosure can provide a touch display device comprising a plurality of touch electrodes disposed in a display panel, and a plurality of touch lines electrically coupled to each of the plurality of touch electrodes.

The each of the plurality of touch electrodes can comprise a plurality of first electrode parts disposed on a first sensor layer, and a plurality of second electrode parts disposed on a second sensor layer which is different from the first sensor layer and electrically coupled to at least one of the plurality of first electrode parts.

Each of the plurality of touch lines can comprise a plurality of first line parts disposed on the first sensor layer, and a plurality of second line parts disposed on the second sensor layer, a portion of the plurality of second line parts overlaps to at least one of the plurality of first electrode parts, and the plurality of second line parts is electrically coupled to adjacent two first line parts of the plurality of first line parts.

The plurality of touch lines can comprise a first touch line and a second touch line. At least a portion of a first line part of the first touch line can overlap to a second line part of the second touch line. At least a portion of a second line part of the first touch line can overlap to a first line part of the second touch line.

At least one of the plurality of first electrode parts is located between a first point where the first line part of the first touch line and the second line part of the first touch line are coupled to each other and a second point where the first line part of the second touch line and the second line part of the second touch line are coupled to each other.

In another aspect, embodiments of the present disclosure can provide a touch display device comprising a plurality of touch electrodes, and a plurality of touch lines electrically coupled to each of the plurality of touch electrodes, wherein each of the plurality of touch lines comprises, a plurality of first line parts disposed on a first sensor layer, and a plurality of second line parts disposed on a second sensor layer which is different from the first sensor layer and electrically coupled between adjacent two first line parts of the plurality of first line parts.

A length of each of the plurality of second line parts included in the each of the plurality of touch lines can be greater than a length of each of the plurality of first line parts included in the each of the plurality of touch lines.

According to various embodiments of the present disclosure, as a touch line disposed in a display panel comprises a plurality of first line parts disposed on a first sensor layer and a plurality of second line parts disposed on a second sensor layer, at least a portion of different touch lines can be disposed to be overlapped, thus a reduction of an aperture ratio or a transmittance of a subpixel due to an arrangement of the touch line can be reduced or minimized.

According to various embodiments of the present disclosure, as at least a portion of different touch lines can be disposed to be overlapped, a touch sensitivity can be enhanced by further disposing touch electrodes, or a touch display device having a large area with many channels can be implemented easily by further disposing touch lines.

BRIEF DESCRIPTION OF THE SEVERAL VIEWS OF THE DRAWINGS

The above and other features, and advantages of the present disclosure will be more clearly understood from the following detailed description, taken in conjunction with the accompanying drawings, in which:

FIGS. 8A and 8B are diagrams illustrating examples of a structure which a touch line is connected to a touch electrode in a touch display device according to embodiments of the present disclosure.

DETAILED DESCRIPTION

Figure 1:
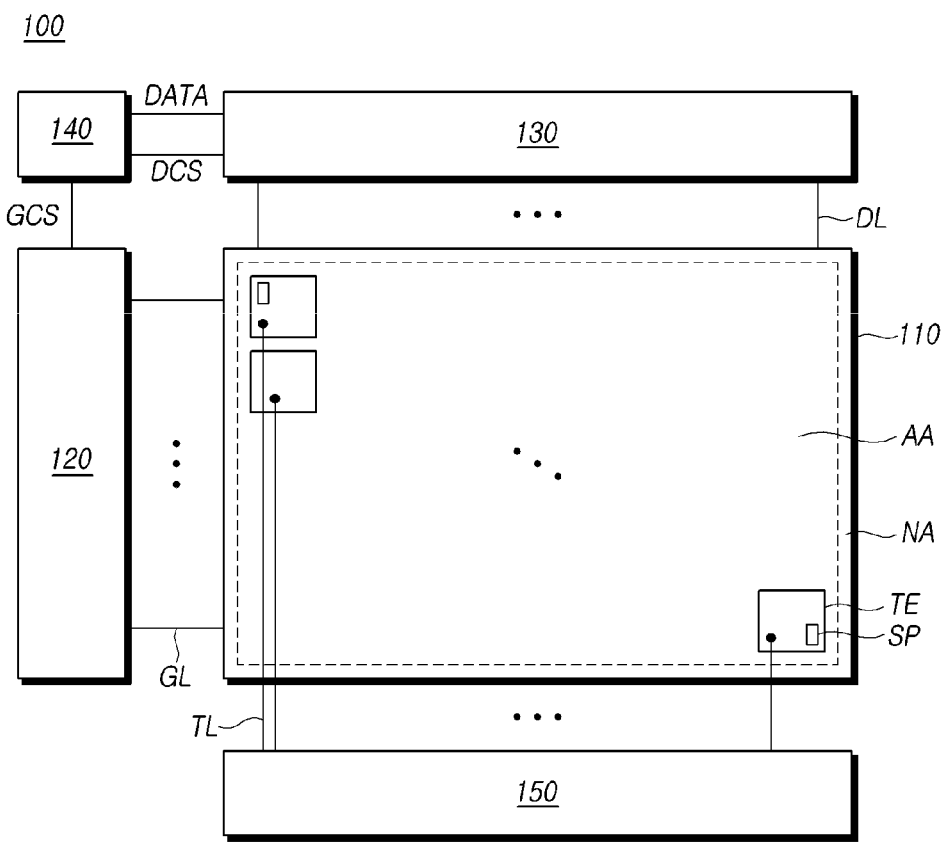
FIG. 1 is a diagram schematically illustrating components included in a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

FIG. 1 is a diagram schematically illustrating components included in a touch display device 100 according to embodiments of the present disclosure.

Referring to FIG. 1, the touch display device 100 according to embodiments of the present disclosure can comprise a display panel 110 comprising an active area AA where a plurality of subpixels SP is disposed and a non-active area NA which is located outside the active area AA. The touch display device 100 can comprise a gate driving circuit 120, a data driving circuit 130 and a controller 140 for driving various signal lines disposed in the display panel 110.

A plurality of gate lines GL and a plurality of data lines DL can be disposed in the display panel 110. The plurality of subpixels SP can be located in areas where the gate lines GL and the data lines DL overlap each other.

The gate driving circuit 120 is controlled by the controller 140, and sequentially outputs scan signals to the plurality of gate lines GL arranged on the display panel 110, thereby controlling the driving timing of the plurality of subpixels SP.

The gate driving circuit 120 can comprise one or more gate driver integrated circuits GDIC. The gate driving circuit 120 can be located only at one side of the display panel 110, or can be located at both sides thereof according to a driving method.

Each gate driver integrated circuit GDIC can be connected to a bonding pad of the display panel 110 by a tape automated bonding TAB method or a chip-on-glass COG method, or can be implemented by a gate-in-panel GIP method to then be directly arranged on the display panel 110. In some cases, each gate driver integrated circuit GDIC can be integrated and arranged on the display panel 110. In addition, each gate driver integrated circuit GDIC can be implemented by a chip-on-film COF method in which an element is mounted on a film connected to the display panel 110.

The data driving circuit 130 receives image data from the controller 140 and converts the image data into an analog data voltage Vdata. Then, the data driving circuit 130 outputs the data voltage Vdata to each data line DL according to the timing at which the scan signal is applied through the gate line GL so that each of the plurality of subpixels SP emits light having brightness according to the image data.

The data driving circuit 130 can comprise one or more source driver integrated circuits SDIC.

Each source driver integrated circuit SDIC can comprise a shift register, a latch circuit, a digital-to-analog converter, an output buffer, and the like.

Each source driver integrated circuit SDIC can be connected to a bonding pad of the display panel 110 by a tape automated bonding TAB method or a chip-on-glass COG method, or can be directly disposed on the display panel 110. Alternatively, in some cases, each source driver integrated circuit SDIC can be integrated and arranged on the display panel 110. In addition, each source driver integrated circuit SDIC can be implemented by a chip-on-film COF method in which each source driver integrated circuit SDIC can be mounted on a film connected to the display panel 110, and can be electrically connected to the display panel 110 through wires on the film.

The controller 140 supplies various control signals to the gate driving circuit 120 and the data driving circuit 130, and controls the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 allows the gate driving circuit 120 to output a scan signal according to the timing implemented in each frame, and converts a data signal received from the outside to conform to the data signal format used in the data driving circuit 130 and then outputs the converted image data to the data driving circuit 130.

The controller 140 receives, from the outside (e.g., a host system), various timing signals including a vertical synchronization signal VSYNC, a horizontal synchronization signal HSYNC, an input data enable DE signal, a clock signal CLK, and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 outputs various gate control signals GCS including a gate start pulse GSP, a gate shift clock GSC, a gate output enable signal GOE, or the like.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 outputs various data control signals DCS including a source start pulse SSP, a source sampling clock SSC, a source output enable signal SOE, or the like.

The source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The touch display device 100 can further comprise a power management integrated circuit for supplying various voltages or currents to the display panel 110, the gate driving circuit 120, the data driving circuit 130, and the like or controlling various voltages or currents to be supplied thereto.

A liquid crystal or a light-emitting element can be disposed on each subpixel SP depending on the type of the display panel 110. In addition, an electrode which the data voltage Vdata is applied, and an electrode which a common voltage is applied or the like can be disposed on the subpixel SP.

Furthermore, the touch display device 100 can comprise a sensor, a line and a driving circuit or the like for sensing a touch of a user to the display panel 110.

For example, the touch display device 100 according to embodiments of the present disclosure can comprise a plurality of touch electrode TE disposed on the active area AA, a touch driving circuit 150 driving the touch electrode TE, and a plurality of touch lines TL connecting the touch electrode TE and the touch driving circuit 150 to each other. Furthermore, the touch display device 100 can comprise a touch controller(not illustrated) for controlling the touch driving circuit 150 and sensing a touch based on a signal detected by the touch driving circuit 150.

The touch electrode TE, for example, can be a transparent electrode. Alternatively, the touch electrode TE can be an opaque electrode and at least a portion of the touch electrode TE can be opened.

In the case that the touch electrode TE comprises an opened portion, the touch electrode TE can be a mesh shape. The opened portion of the touch electrode TE can be overlapped to a light-emitting area disposed on each sub-pixel SP.

A connection structure of the touch line TL and the touch electrode TE can be various according to an arrangement structure of the touch electrode TE and a touch sensing method. For example, one touch line TL can be connected to a plurality of touch electrode TE, or at least one touch line TL can be connected to each touch electrode TE.

For example, the plurality of touch electrode TE can comprise a plurality of touch electrode TE connected in an X-axis direction, and a plurality of touch electrode TE connected in a Y-axis direction. And the touch line TL electrically connected to the touch electrode TE connected in the X-axis direction and the touch line TL electrically connected to the touch electrode TE connected in the Y-axis direction can be disposed.

In this case, the plurality of touch electrode TE can be disposed on a same layer. some of the plurality of touch electrodes TE can be connected by a connecting line disposed on a same layer, and rest of the plurality of touch electrodes TE can be connected by a connecting line disposed on a different layer.

When a touch is sensed, a touch driving signal can be applied to the plurality of touch electrodes TE connected in the X-axis direction or the Y-axis direction, and a touch sensing signal can be detected from the plurality of touch electrodes TE connected in the X-axis direction or the Y-axis direction. In a state that different signals are applied to the touch electrode TE in the X-axis direction and the touch electrode TE connected in the Y-axis direction, a touch can be sensed by detecting a change of a mutual-capacitance between the touch electrodes TE occurred by the touch.

For another example, the plurality of touch electrodes TE can be disposed to be separated, and the touch line TL can be electrically connected to each touch electrode TE.

In this case, the plurality of touch electrode TE can be disposed on a same layer. The plurality of touch lines TL can be disposed on a layer different from a layer where the touch electrode TE is disposed. Each of the plurality of touch lines TL can be electrically connected to each of the plurality of touch electrodes TE. A portion of the touch line TL can be overlapped to the touch electrode TE which is not electrically connected to the touch line TL.

The touch driving signal can be supplied to the touch electrode TE through the touch line TL, and a touch can be sensed by detecting a change of a self-capacitance detected through the touch line TL.

Alternatively, in some cases, in a structure that the touch electrode TE connected in the X-axis direction and the touch electrode TE connected in the Y-axis direction are disposed, a sensing based on the mutual-capacitance and a sensing based on the self-capacitance can be performed.

The touch driving circuit 150 can output the touch driving signal to the touch electrode TE through the touch line TL, and can detect the touch sensing signal from the touch electrode TE.

The touch driving circuit 150, for example, can comprise an operational amplifier which is connected to the touch line TL to supply the driving signal and receive the touch sensing signal, and a feedback capacitor which accumulates charges according to a signal received by the operational amplifier. Furthermore, the touch driving circuit 150 can comprise an integrator processing an output signal of the operational amplifier, a sample and hold circuit and an analog-to-digital converter, or the like.

The touch driving circuit 150 can convert the touch sensing signal detected from the touch electrode TE into a digital type of sensing data, and can transmit the sensing data to the touch controller. The touch controller can detect presence or absence of a touch and a touch coordinate or the like based on the sensing data received from the touch driving circuit 150.

The touch driving circuit 150 can be disposed on the display panel 110 as a separate circuit, in some cases, can be implemented as an integrated type with the data driving circuit 130 or the like and be disposed.

As described above, according to embodiments of the present disclosure, a touch of a user to the display panel 110 can be sensed by driving the touch electrode TE included in the touch display device 100. And the touch electrode TE can be disposed on the display panel 100, or can be disposed as an embedded type in the display panel 110.

Here, in the case that the touch electrode TE is disposed as the embedded type in the display panel 110, depending on types of the touch display device 100, a structure that the touch electrode TE is disposed can be different.

For example, the touch electrode TE, in the case that the touch display device 100 is a top emission structure, can be disposed on an encapsulation portion protecting the light-emitting element in the display panel 110. Alternatively, the touch electrode TE, in the case that the touch display device 100 is a bottom emission structure, can be disposed under the light-emitting element.

Furthermore, the touch line TL connected to the touch electrode TE, depending on types, can be disposed on the non-active area NA of the display panel 110, or can be disposed on the active area AA of the display panel 110.

The touch electrode TE and the touch line TL disposed on the active area AA of the display panel 110 can be disposed to avoid at most an area where a light is emitted in the subpixel SP.

Figure 2:
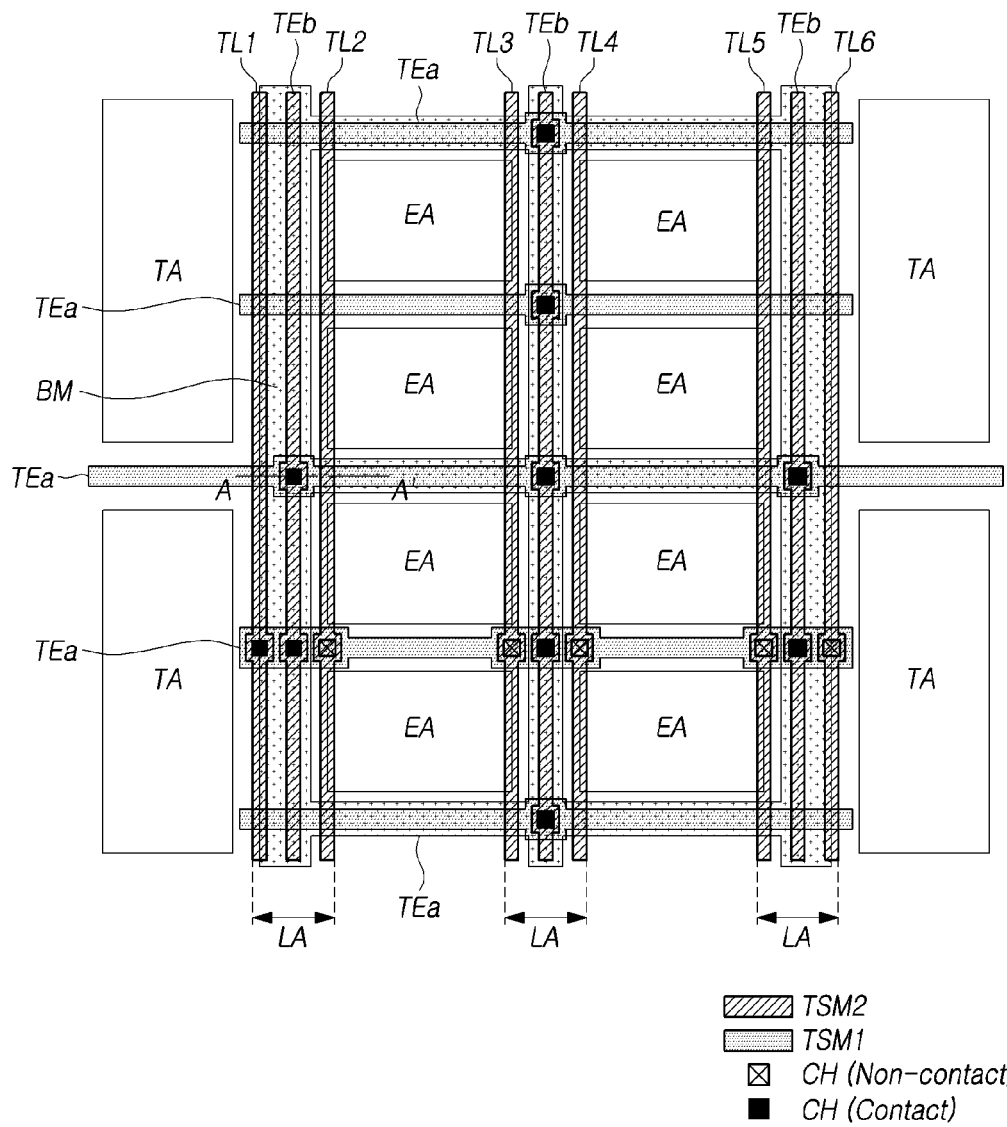
FIG. 2 is a diagram illustrating an example of a plane structure which a touch electrode and a touch line are disposed in a touch display device according to embodiments of the present disclosure.
Figure 3:
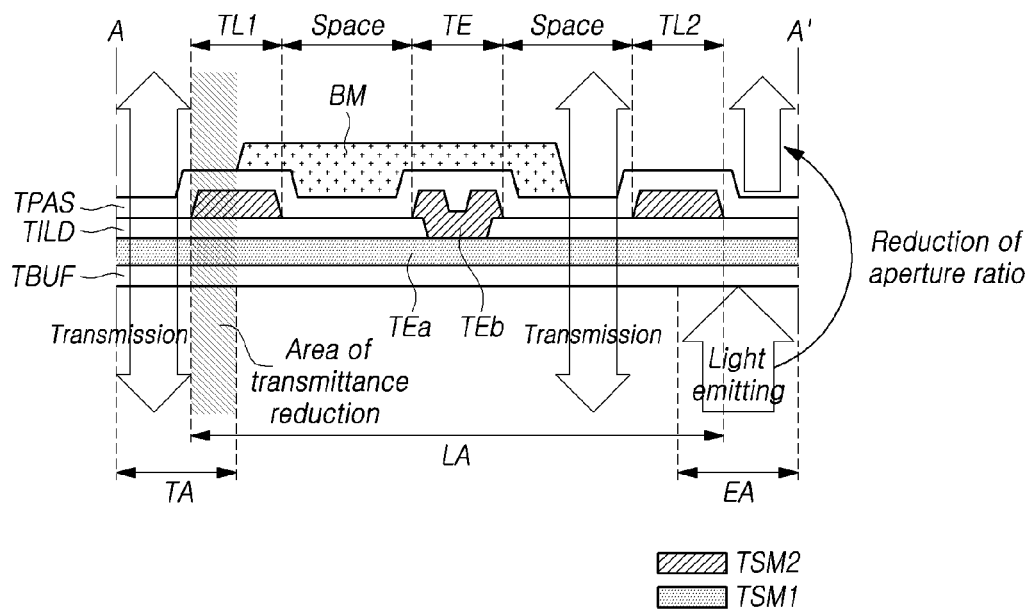
FIG. 3 is a diagram illustrating an example of a cross-sectional structure, taken along line A-A' in FIG. 2.

FIG. 2 is a diagram illustrating an example of a plane structure which the touch electrode TE and the touch line TL are disposed in the touch display device 100 according to embodiments of the present disclosure. FIG. 3 is a diagram illustrating an example of a cross-sectional structure, taken along line A-A' in FIG. 2.

Referring to FIG. 2, it illustrates an example of the top emission structure that the touch display device 100 emits a light to a front of a substrate. And it illustrates an example of a case that the touch display device 100 is a transparent display device which has a high transmittance.

Each subpixel SP included in the touch display device 100 can comprise an emission area EA where a light emitted by the light-emitting element is output to outside. Each subpixel SP can comprise a circuit area where various circuit elements for driving the light-emitting element disposed on the emission area EA are disposed. At least a portion of the circuit area can overlap to the emission area EA.

In the case that the touch display device 100 is the bottom emission structure, the emission area EA can be located not to be overlapped to the circuit area.

At least a portion of an area other than the emission area EA and the circuit area in the subpixel SP can be a transparent area TA where the circuit element or a line are not disposed. As the subpixel SP comprises the transparent area TA having a high transmittance, the transparent display device can be implemented.

The subpixel SP can comprise a line area LA where at least a portion of the touch electrode TE and the touch line TL for a touch sensing are disposed.

The touch electrode TE can be disposed on a same layer as the touch line TL. The touch electrode TE can be disposed on a different layer from the touch line TL. Alternatively, a portion of the touch electrode TE and a portion of the touch line TL can be disposed on a same layer.

For example, the touch electrode TE can comprise a plurality of first electrode parts TEa made of a first touch sensor metal TSM1 disposed on a first sensor layer.

The touch electrode TE can comprise a plurality of second electrode parts TEb made of a second touch sensor metal TSM2 disposed on a second sensor layer which is different from the first sensor layer.

At least one insulating layer can be disposed between the first sensor layer and the second sensor layer. And, for example, the second sensor layer can be located over the first sensor layer, but embodiments of the present disclosure are not limited to this.

The second electrode part TEb of the touch electrode TE can be disposed along a direction crossing a direction which the first electrode part TEa of the touch electrode TE is disposed.

The second electrode part TEb of the touch electrode TE can be electrically connected to the first electrode part TEa of the touch electrode TE through a contact hole CH. A mesh shape of touch electrode TE can be made by a structure that the first electrode part TEa and the second electrode part TEb of the touch electrode TE are connected.

The touch line TL, for example, can be made of the second touch sensor metal TSM2 disposed on the second sensor layer.

The touch line TL can be electrically connected to the first electrode part TEa of the touch electrode TE through the contact hole CH.

As the touch line TL is made of the second touch sensor metal TSM2, the touch line TL can be disposed on a same layer as the second electrode part TEb of the touch electrode TE. And in a case that the number of the touch line TL for an electrical connection between the touch electrode TE and the touch driving circuit 150 increases, the touch line TL disposed on the line area LA can increase.

Thus, a portion of the line area LA can overlaps the emission area EA or the transparent area TA.

Referring to FIG. 3, the touch electrode TE and the touch line TL can be disposed on the touch buffer layer TBUF. Although it is not illustrated in FIG. 3, the light-emitting element, the circuit element driving the light-emitting element and the encapsulation portion protecting the light-emitting element or the like can be disposed under the touch buffer layer TBUF.

The first electrode part TEa of the touch electrode TE made of the first touch sensor metal TSM1 can be disposed on the touch buffer layer TBUF. A touch insulating layer TILD can be disposed on the first electrode part TEa of the touch electrode TE.

The second electrode part TEb of the touch electrode TE and the touch line TL made of the second touch sensor metal TSM2 can be disposed on the touch insulating layer TILD.

A touch protective layer TPAS can be disposed on the second electrode part TEb of the touch electrode TE and the touch line TL. A black matrix BM can be disposed on a part area on the touch protective layer TPAS.

Since a portion of the line area LA where the touch line TL is disposed overlaps the emission area EA, an aperture ratio of the subpixel SP can be reduced. Since the portion of the line area LA overlaps the transparent area TA, a transmittance of the subpixel SP can be reduced.

The touch display device 100 according to embodiments of the present disclosure provides methods that are capable of reducing or minimizing a reduction of the aperture ratio or the transmittance of the subpixel SP due to an increase of the number of the touch line TL disposed in the display panel 110.

Figure 4:
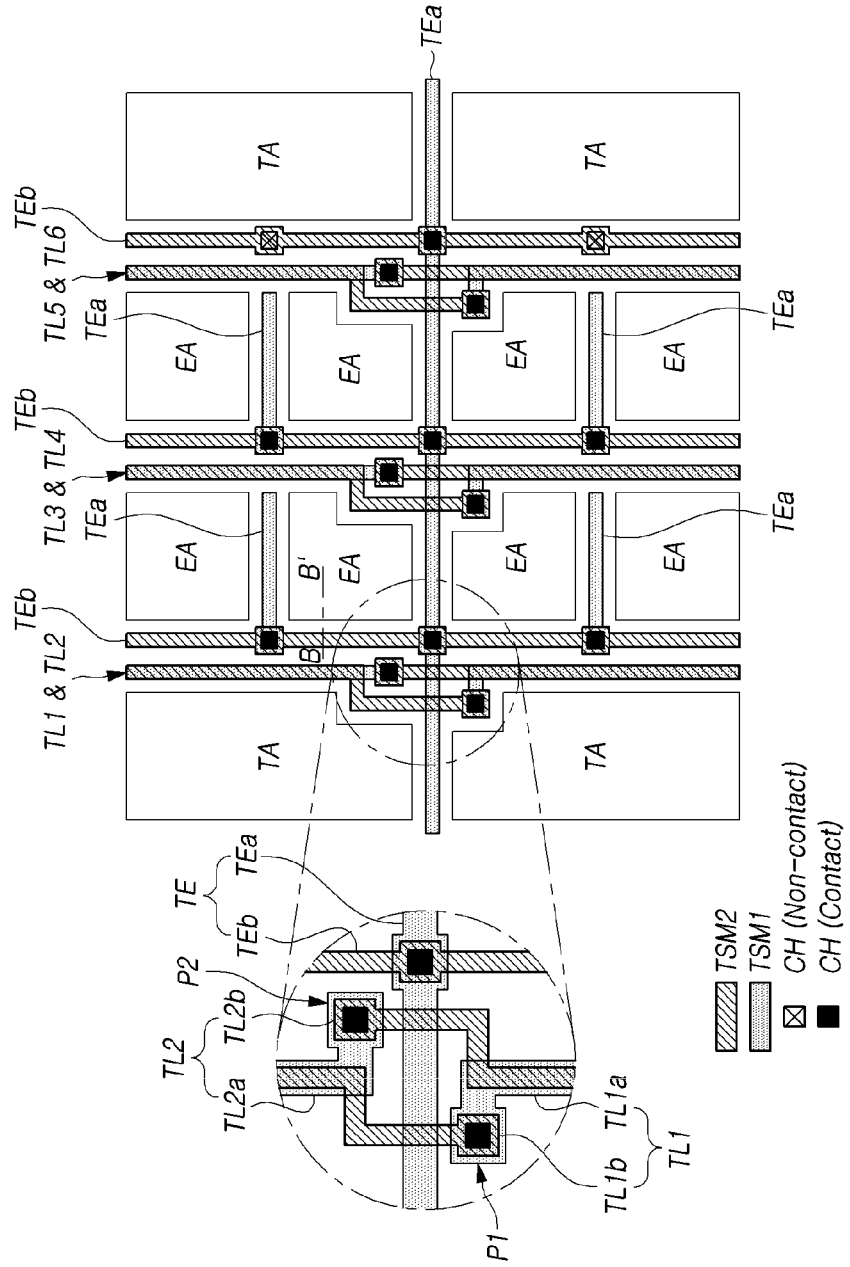
FIG. 4 is a diagram illustrating another example of a plane structure which a touch electrode and a touch line are disposed in a touch display device according to embodiments of the present disclosure.
Figure 5:
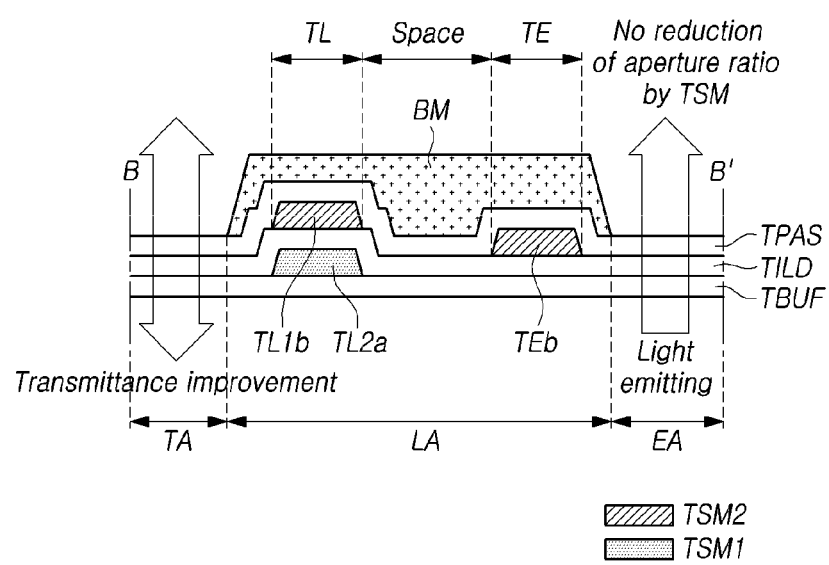
FIG. 5 is a diagram illustrating an example of a cross-sectional structure, taken along line B-B' in FIG. 4.

FIG. 4 is a diagram illustrating another example of a plane structure which the touch electrode TE and the touch line TL are disposed in the touch display device 100 according to embodiments of the present disclosure. FIG. 4 is a diagram illustrating a structure excluding a structure that the black matrix BM is disposed, for a clear illustration of an arrangement structure of the touch electrode TE and the touch line TL. FIG. 5 is a diagram illustrating an example of a cross-sectional structure, taken along line B-B' in FIG. 4.

Referring to FIG. 4, the touch electrode TE can comprise the plurality of first electrode parts TEa and the plurality of second electrode parts TEb.

The first electrode part TEa of the touch electrode TE can be made of the first touch sensor metal TSM1 disposed on the first sensor layer. The second electrode part TEb of the touch electrode TE can be made of the second touch sensor metal TSM2 disposed on the second sensor layer.

The first electrode part TEa of the touch electrode TE can be disposed along a direction crossing a direction which the second electrode part TEb of the touch electrode TE is disposed. The first electrode part TEa of the touch electrode TE can be electrically connected to the second electrode part TEb of the touch electrode TE through the contact hole CH.

The touch line TL can comprise a plurality of first line parts TLa and a plurality of second line parts TLb.

The first line part TLa of the touch line TL can be made of the first touch sensor metal TSM1 disposed on the first sensor layer. The second line part TLb of the touch line TL can be made of the second touch sensor metal TSM2 disposed on the second sensor layer.

The plurality of first line parts TLa and the plurality of second line parts TLb included in the touch line TL can be disposed alternatively along a direction the touch line TL is disposed. And the first line part TLa of the touch line TL and the second line part TLb of the touch line TL can be electrically connected to each other through the contact hole CH.

Thus, at least a portion of any one of the touch line TL can be disposed to overlap to other touch line TL.

For example, at least a portion of a first touch line TL1 can be disposed to overlap to a second touch line TL2.

At least a portion of a first line part TL1a of the first touch line TL1 can be disposed to overlap to a second line part TL2b of the second touch line TL2.

At least a portion of a second line part TL1b of the first touch line TL1 can be disposed to overlap to a first line part TL2a of the second touch line TL2.

As each of the first touch line TL1 and the second touch line TL2 has a structure that the first line part TLa made of the first touch sensor metal TSM1 and the second line part TLb made of the second touch sensor metal TSM2 are alternated and connected to each other, at least a portion of the first touch line TL1 can be disposed to overlap to the second touch line TL2.

Thus, an area where the first touch line TL1 and the second touch line TL2 are disposed can be reduced or minimized. As the area where the touch line TL is disposed is reduced or minimized, a reduction of the aperture ratio or the transmittance of the subpixel SP due to an arrangement of the touch line TL can be reduced or minimized.

Referring to FIG. 5, it illustrates an example of a cross-sectional structure of a portion which the second line part TL1b of the first touch line TL1 and the first line part TL2a of the second touch line TL2 are overlapped to each other.

Since the first touch line TL1 and the second touch line TL2 are disposed to overlap to each other, the area where the touch line TL is disposed can be reduced.

It can be prevented that the aperture ratio or the transmittance of the subpixel SP due to the arrangement of the touch line TL is reduced.

Furthermore, even if the black matrix BM is disposed on the touch line TL such as the example illustrated in FIG. 3, as the touch line TL can be wholly located in an area where the black matrix BM is disposed, a reduction of the aperture ratio or the transmittance due to the arrangement of the touch line TL can be prevented.

Thus, the touch electrode TE and the touch line TL can be disposed while reducing or minimizing a reduction of the aperture ratio and transmittance of the subpixel SP. Alternatively, a touch sensitivity can be enhanced by further arrangement of the touch electrode TE, or the touch display device 100 having a large area can be implemented easily by further arrangement of the touch line TL.

Since a portion of the touch line TL is disposed by using the first touch sensor metal TSM1, a structure of the first electrode part TEa of the touch electrode TE which is disposed by using the first touch sensor metal TSM1 can be changed.

Referring to FIG. 4, at least one of the plurality of first electrode parts TEa included in the touch electrode TE can be located on an area between the touch lines TL. And only one end of the first electrode part TEa can be electrically connected to the second electrode part TEb through the contact hole CH.

At least one of the plurality of first electrode parts TEa included in the touch electrode TE can be disposed to cross the touch line TL.

For example, the first electrode part TEa can be disposed to pass an area between a first point P1 where the first line part TL1a of the first touch line TL1 is electrically connected to the second line part TL1b of the first touch line TL1 and a second point P2 where the first line part TL2a of the second touch line TL2 is electrically connected to the second line part TL2b of the second touch line TL2.

The first line part TLa disposed on the first sensor layer and the second line part TLb disposed on the second sensor layer can be alternated and can constitute the touch line TL.

Thus, on an area where the touch line TL is changed from the first line part TLa to the second line part TLb, or from the second line part TLb to the first line part TLa, the first electrode part TEa of the touch electrode TE made of the first touch sensor metal TSM1 can be disposed.

A portion of the second line part TLb of the touch line TL can overlap to the first electrode part TEa of the touch electrode TE.

And, as the second line part TLb of the touch line TL pass over the first electrode part TEa of the touch electrode TE to be connected to the first line part TLa of the touch line TL, a length of the second line part TLb of the touch line TL can be greater than a length of the first line part TLa of the touch line TL.

As described above, a mesh shape of the touch electrode TE can be made by being electrically connected to the touch electrode TE disposed on an adjacent pixel area by the first electrode part TEa of the touch electrode TE disposed to cross the touch line TL.

The first electrode part TEa of the touch electrode TE crossing the touch line TL can be electrically connected to the second electrode part TEb through the contact hole CH between the first point P1 and the second point P2.

Alternatively, the first electrode part TEa of the touch electrode TE can be electrically connected to the second electrode part TEb through the contact hole CH on an area other than an area between the first point P1 and the second point P2.

Figure 6:
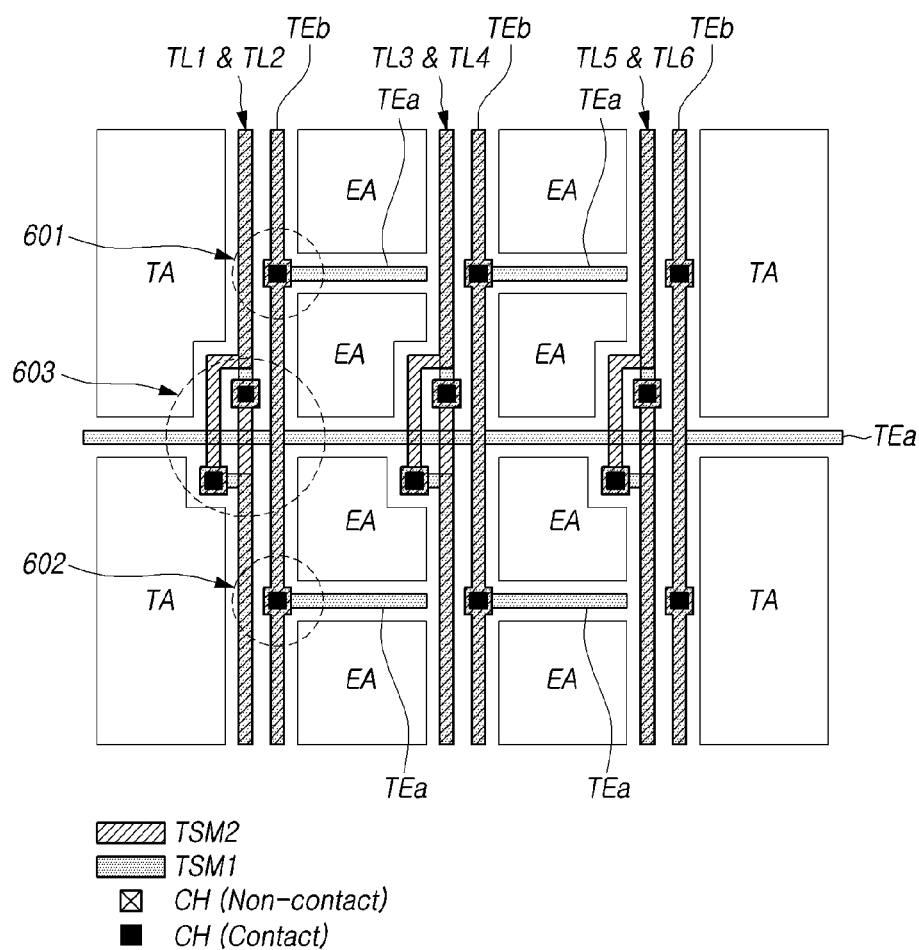
FIGS. 6 and 7 are diagrams illustrating other examples of a plane structure which a touch electrode and a touch line are disposed in a touch display device according to embodiments of the present disclosure.
Figure 7:
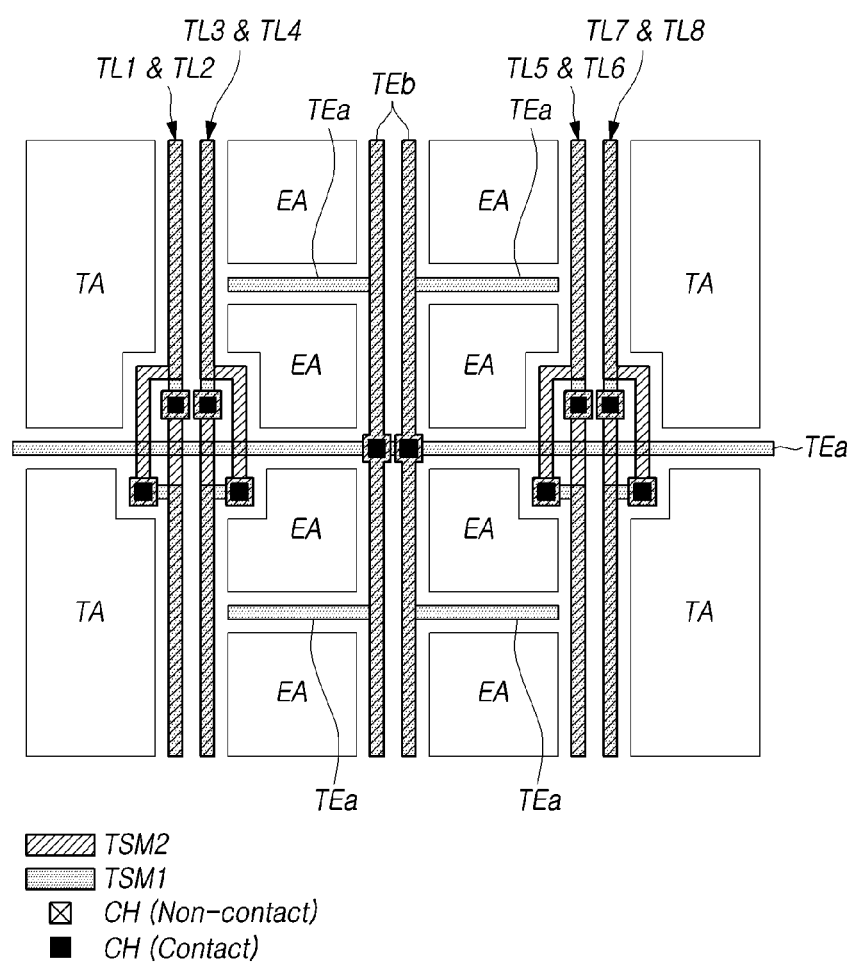

FIGS. 6 and 7 are diagrams illustrating other examples of a plane structure which the touch electrode TE and the touch line TL are disposed in the touch display device 100 according to embodiments of the present disclosure.

Referring to FIG. 6, the touch line TL, as described above, can comprise the plurality of first line parts TLa and the plurality of second line parts TLb.

The first line part TLa of the touch line TL and the second line part TLb of the touch line TL can be disposed alternatively along a direction which the touch line TL is disposed. The first line part TLa of the touch line TL can be electrically connected to the second line part TLb of the touch line TL through the contact hole CH.

The touch electrode TE can comprise the plurality of first electrode parts TEa and the plurality of second electrode parts TEb.

The second electrode part TEb of the touch electrode TE made of the second touch sensor metal TSM2 can be disposed along a direction which the touch line TL is disposed.

A portion of the first electrode part TEa of the touch electrode TE made of the first touch sensor metal TSM1 can be disposed along a direction crossing a direction which the touch line TL is disposed. Furthermore, other portion of the first electrode TEa can be disposed along the direction which the touch line TL is disposed.

For example, the first electrode part TEa can be disposed on an area overlapping to the second electrode part TEb of the touch electrode TE being adjacent to the first touch line TL1 and the second touch line TL2.

The first electrode part TEa overlapping to the second electrode part TEb of the touch electrode TE can partially overlap to the touch line TL, and can be integral with the first electrode part TEa crossing the second electrode part TEb of the touch electrode TE.

Thus, the first electrode part TEa and the second electrode part TEb of the touch electrode TE can be electrically connected to each other on an area other than an area where the touch line TL and the first electrode part TEa of the touch electrode TE are crossed.

For example, on an area indicated by 601 and an area indicated by 602, the first electrode part TEa and the second electrode part TEb of the touch electrode TE can be electrically connected.

Therefore, on an area indicated by 603, the contact hole CH for an electrical connection between the first electrode part TEa and the second electrode part TEb of the touch electrode TE may not be disposed.

The area indicated by 603 can be an area for an arrangement of the contact hole CH for an electrical connection between the first line part TLa and the second line part TLb of the touch line TL.

On the area indicated by 603, as the contact hole CH for an electrical connection between the first electrode part TEa and the second electrode part TEb of the touch electrode TE can be removed, a reduction of the transparent area TA due to the contact hole CH can be reduced or minimized on an area where the touch sensor metal TSM constituting the touch line TL is changed.

And the example illustrated in FIG. 6 illustrates an example of a structure that the touch line TL and the second electrode part TEb of the touch electrode TE are disposed alternatively. As the touch line TL is disposed repetitively, a difference of a parasitic capacitance between the touch line TL and a peripheral electrode can be reduced and a touch sensing performance having a high uniformity can be provided.

Alternatively, by disposing the touch line TL wholly between the emission area EA and the transparent area TA, the number of the touch line TL disposed in the display panel 110 can be increased while reducing or minimizing an area where the touch line TL is disposed.

Referring to FIG. 7, the touch electrode TE can comprise the first electrode part TEa and the second electrode part TEb. The second electrode part TEb of the touch electrode TE can be disposed along a direction which the touch line TL is disposed.

A portion of the first electrode part TEa of the touch electrode TE can be disposed to overlap to the second electrode part TEb of the touch electrode TE. Other portion of the first electrode part TEa of the touch electrode TE can be disposed to cross the second electrode part TEb of the touch electrode TE.

The second electrode part TEb of the touch electrode TE can be located between the emission areas EA of the subpixel SP The touch line TL, for example, can be located between the emission area EA and the transparent area TA.

The touch line TL can comprise the plurality of first line parts TLa and the plurality of second line parts TLb. And the first line part TLa and the second line part TLb can be disposed alternatively.

At least a portion of the first touch line TL1 can be disposed to overlap to the second touch line TL2. At least a portion of a third touch line TL3 can be disposed to overlap to at least a portion of a fourth touch line TL4. Similarly, a fifth touch line TL5, a sixth touch line TL6, a seventh touch line TL7 and a eighth touch line TL8 can be disposed.

The number of the touch line TL disposed can be increased while maintaining substantially same an area where the touch electrode TE and the touch line TL are disposed.

Thus, the touch line TL can be disposed while reducing or minimizing a reduction of the aperture ratio or the transmittance of the subpixel SP due to the arrangement of the touch line TL in the touch display device having a large area.

And, as a portion of the touch line TL is disposed on a same layer with a layer where a portion of the touch electrode TE is disposed, the contact hole CH for an electrical connection between the touch line TL and the touch electrode TE may not be disposed.

Figure 8B:
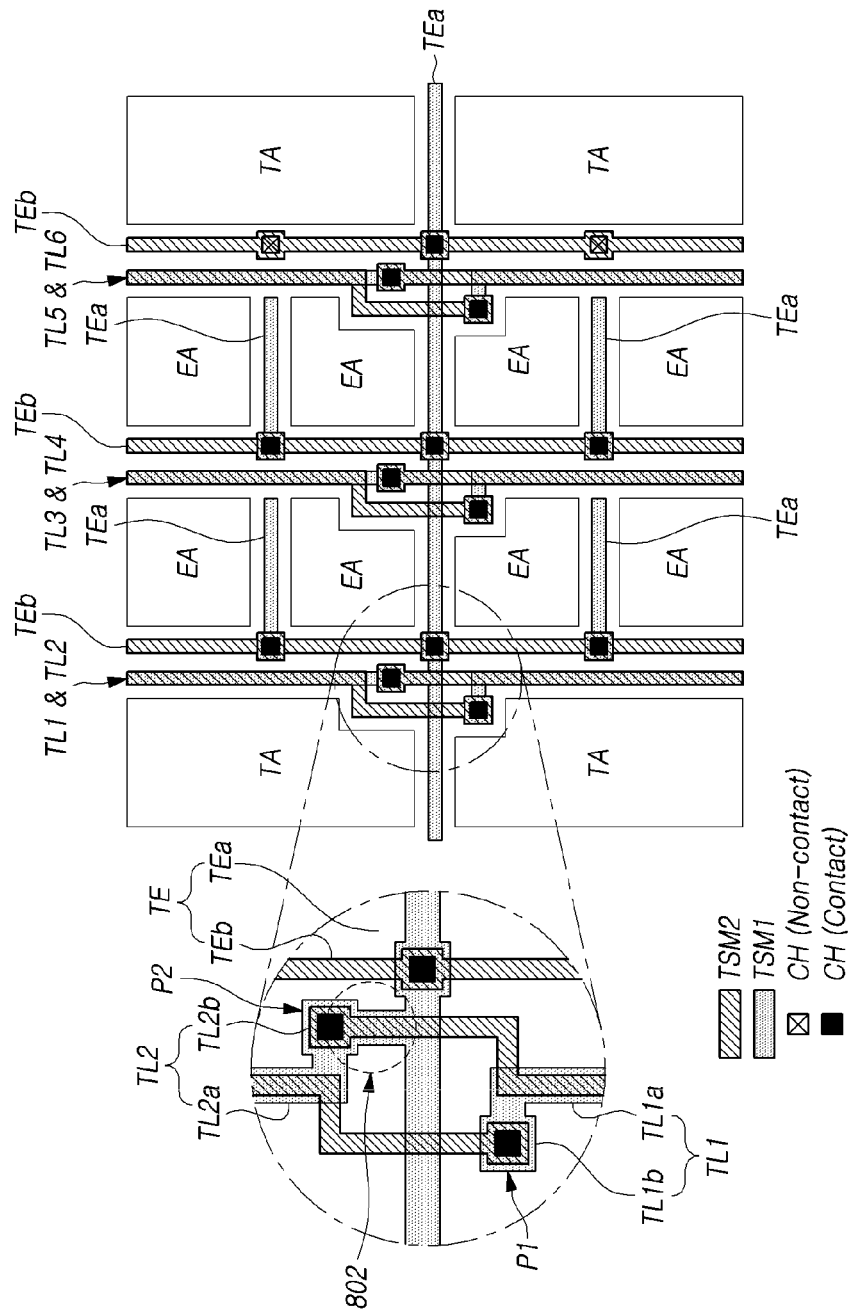

FIGS. 8A and 8B are diagrams illustrating examples of a structure which the touch line TL is connected to the touch electrode TE in the touch display device 100 according to embodiments of the present disclosure. FIGS. 8A and 8B illustrate examples of a structure connecting between the touch line TL and the touch electrode TE in the example illustrated in FIG. 4.

Referring to FIGS. 8A and 8B, the first electrode part TEa of the touch electrode TE can pass and be disposed on an area between the first point P1 where the first line part TL1*a* and the second line part TL1*b* of the first touch line TL1 are connected to each other and the second point P2 where the first line part TL2*a* and the second line part TL2*b* of the second touch line TL2 are connected to each other.

For example, such as a portion indicated by 801 illustrated in FIG. 8A, the first line part TL1*a* of the first touch line TL1 can be connected to the first electrode part TEa of the touch electrode TE.

The first line part TL2*a* of the second touch line TL2 may not be connected to the first electrode part TEa of the touch electrode TE.

Thus, without adding the contact hole CH for an electrical connection between the first touch line TL1 and the touch electrode TE, the first touch line TL1 and the touch electrode TE can be electrically connected to each other.

For another example, such as a portion indicated by 802 illustrated in FIG. 8B, the first line part TL2*a* of the second touch line TL2 can be connected to the first electrode part TEa of the touch electrode TE.

The first line part TL1*a* of the first touch line TL1 may not be connected to the first electrode part TEa of the touch electrode TE.

Thus, without adding a separate contact hole CH, the second touch line TL2 and the touch electrode TE can be electrically connected.

As the first line part TLa and the second line part TLb are alternated to constitute the touch line TL, different touch lines TL can be disposed to be overlapped to each other, and a structure that the touch line TL and the touch electrode TE are directly connected can be provided.

Furthermore, the touch line TL can maintain a structure to be separated from the first electrode part TEa of the touch electrode TE on an area where the touch line TL is not connected to the touch electrode TE. Alternatively, in some cases, the touch line TL can be cut, and the cut touch line TL can be connected to the touch electrode TE and can reduce a resistance of the touch electrode TE.

FIGS. 9A, 9B, 9C, and 9D are diagrams illustrating examples of a structure which the touch line TL and a link line LL are disposed in the touch display device 100 according to embodiments of the present disclosure.

Figure 9A:
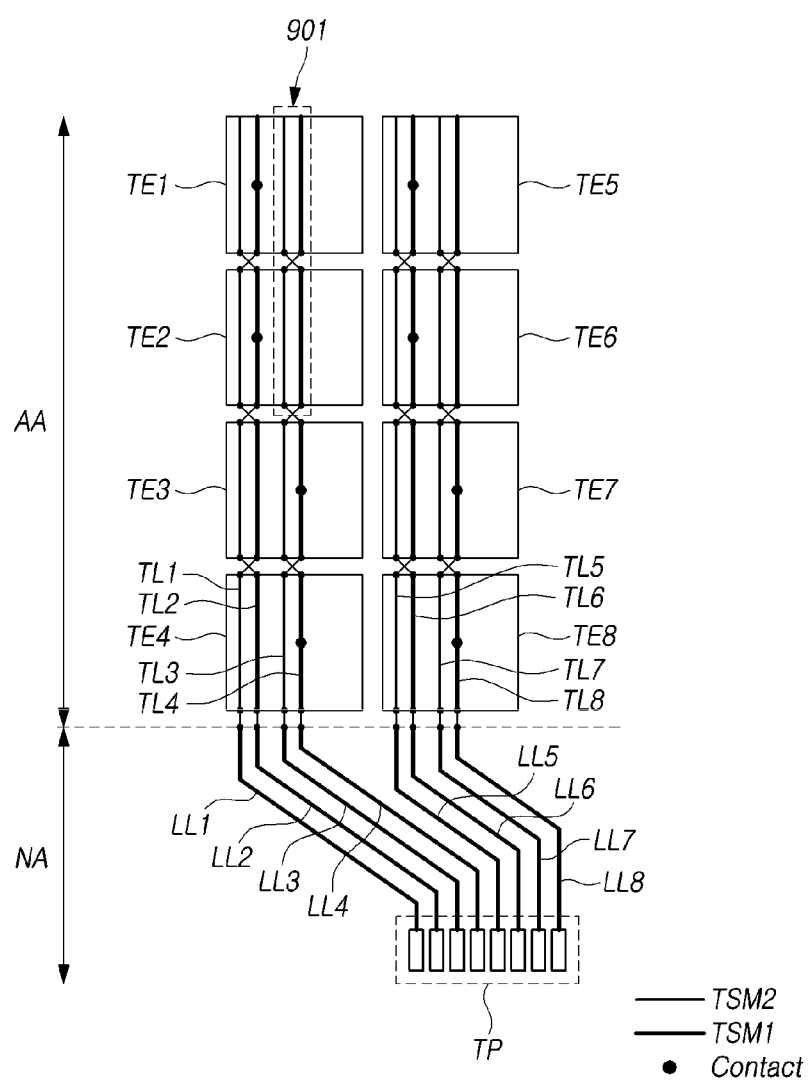
FIGS. 9A, 9B, 9C, and 9D are diagrams illustrating examples of a structure which a touch line and a link line are disposed in a touch display device according to embodiments of the present disclosure.
Figure 9B:
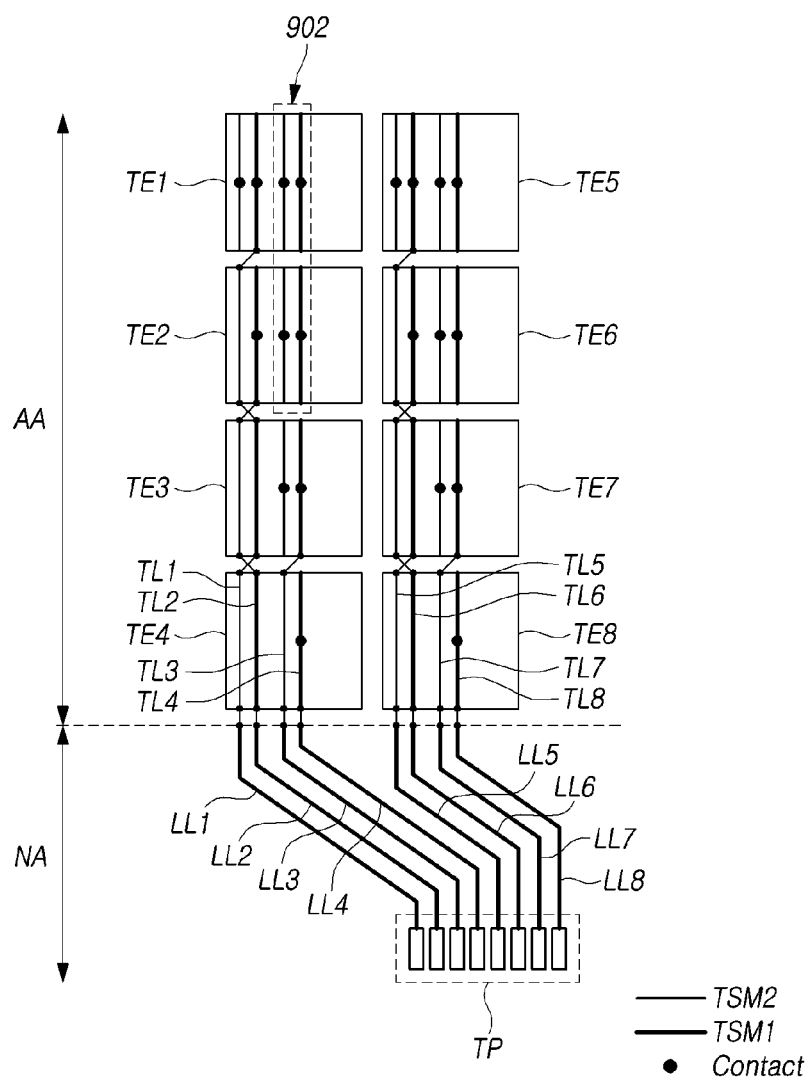

FIGS. 9A and 9B illustrate examples of a structure that the link line LL electrically connecting between the touch line TL and a touch pad TP is made of the first touch sensor metal TSM1. The link line LL can be disposed on the non-active area NA of the display panel 110.

Referring to FIGS. 9A and 9B, the touch line TL can comprise the first line part TLa made of the first touch sensor metal TSM1 and the second line part TLb made of the second touch sensor metal TSM2.

The first line part TLa and the second line part TLb constituting the touch line TL can be disposed alternatively.

The first line part TLa and the second line part TLb can be alternated on an area between the touch electrodes TE. Furthermore, the first line part TLa and the second line part TLb can be alternated in an area corresponding to the touch electrode TE.

On an area where the first electrode part TEa of the touch electrode TE having a mesh shape is disposed to cross the touch line TL, the touch line TL can be changed from the first line part TLa to the second line part TLb, or from the second line part TLb to the first line part TLa.

Thus, the mesh shape of the touch electrode TE is constituted, the touch line TL can be disposed to cross the first electrode part TEa of the touch electrode TE.

The touch line TL can be directly connected to the first electrode part TEa of the touch electrode TE by the first line part TLa constituting the touch line TL.

The touch line TL connected to the touch electrode TE can be extended to an area post a point where the touch line TL is connected to the touch electrode TE, and can overlap to other touch electrode TE.

For example, such as a portion indicated by 901 in FIG. 9A, the third touch line TL3 and the fourth touch line TL4 are extended to an area post a third touch electrode TE3 and a fourth touch electrode TE4, and can overlap to a first touch electrode TE1 and a second touch electrode TE2.

For another example, such as a portion indicated by 902 in FIG. 9B, the third touch line TL3 can be cut on an area post the third touch electrode TE3. The fourth touch line TL4 can be cut on an area post the fourth touch electrode TE4.

The cut touch line TL can be cut to be corresponded to each of overlapped touch electrode TE. And the cut touch line TL can be electrically connected to the overlapped touch electrode TE and can constitute a portion of the touch electrode TE. Thus, a resistance of the touch electrode TE can be reduced.

In this case, the cut touch line TL in an area corresponding to the touch electrode TE can comprise the plurality of first line parts TLa and the plurality of second line parts TLb.

The second line part TLb of the cut touch line TL can pass an area on the first electrode part TEa of the touch electrode TE disposed to cross the touch line TL and can be electrically connected to other first electrode part TEa of the touch electrode TE disposed along a direction which the touch line TL is disposed.

As the second line part TLb of the cut touch line TL constitutes the touch electrode TE, it can be regarded that the second electrode part TEb of the touch electrode TE passes an area on the first electrode part TEa crossing and is electrically connected to the first electrode part TEa disposed in a same direction.

Figure 9C:
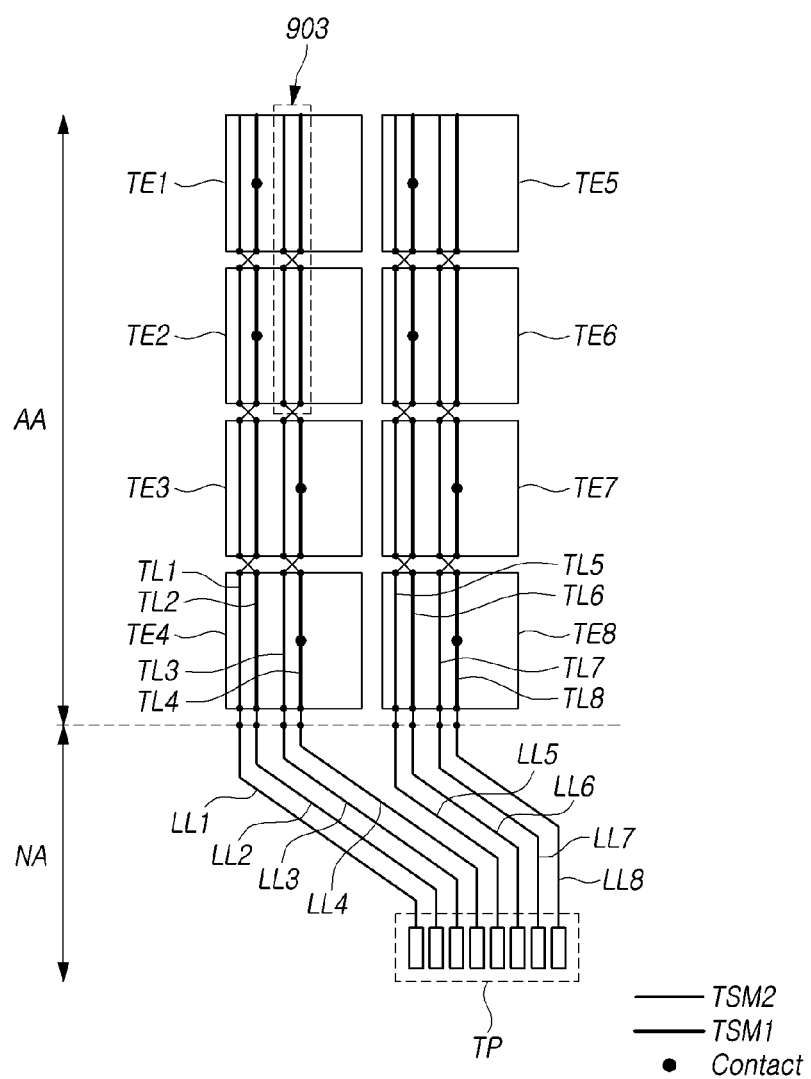
Figure 9D:
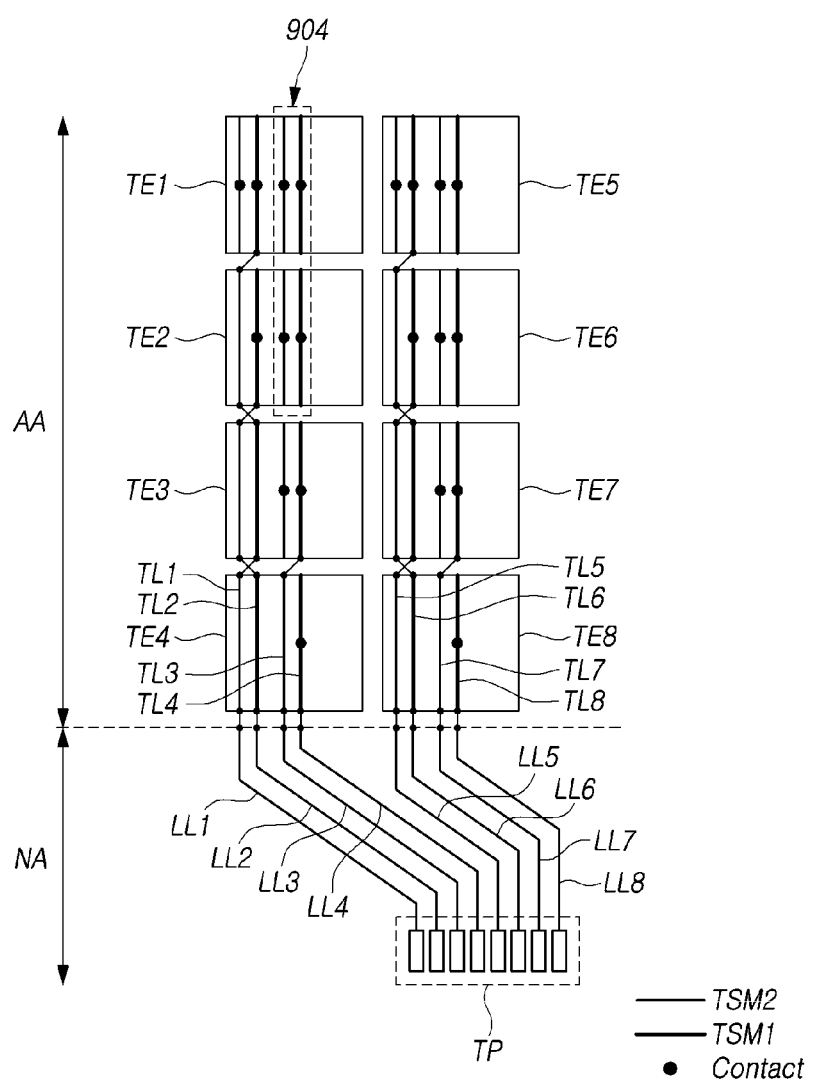

FIGS. 9C and 9D illustrate examples of a structure that the link line LL electrically connecting between the touch line TL and the touch pad TP is made of the second touch sensor metal TSM2.

Such as a portion indicated by 903 illustrated in FIG. 9C, the touch line TL can be extended and disposed to an area post the touch electrode TE electrically connected to the touch line TL.

Alternatively, such as a portion indicated by 904 illustrate in FIG. 9D, the touch line TL is cut on an area post the touch electrode TE electrically connected to the touch line TL, the touch line TL can be electrically connected to overlapping touch electrode TE and can constitute a portion of the touch electrode TE.

In a structure that the touch line TL is made by the first line part TLa and the second line part TLb, a structure connecting between the touch line TL and the touch electrode TE can be implemented variously.

Furthermore, the link line LL connecting between the touch line TL and the touch pad TP each other can be implemented by using the touch sensor metal TSM disposed on a single layer, or can be implemented by using the first touch sensor metal TSM1 disposed on the first sensor layer and the second touch sensor metal TSM2 disposed on the second sensor layer.

Figure 10:
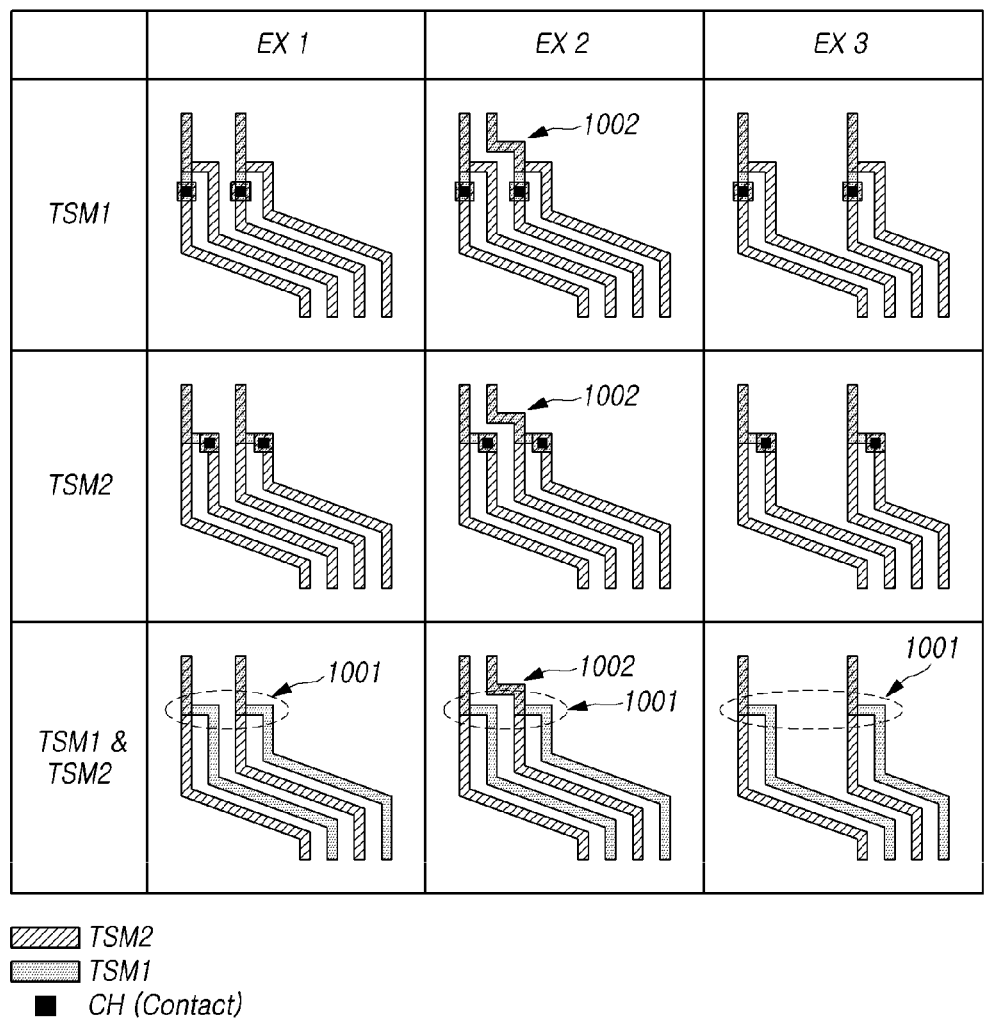
FIG. 10 is a diagram illustrating an example of a structure of a link line disposed in a touch display device according to embodiments of the present disclosure.

FIG. 10 is a diagram illustrating an example of a structure of the link line LL disposed in the touch display device 100 according to embodiments of the present disclosure.

Referring to FIG. 10, the link line LL, for example, can be made of the first touch sensor metal TSM1 disposed on the first sensor layer.

The link line LL can be directly connected to the touch line TL made by the first line part TLa on an area where the touch line TL is connected to the link line LL, and can be connected to the touch line TL made by the second line part TLb through the contact hole CH.

The link line LL, for another example, can be made of the second touch sensor metal TSM2 disposed on the second sensor layer.

The link line LL can be directly connected to the touch line TL made by the second line part TLb on an area where the touch line TL is connected to the link line LL, and can be connected to the touch line TL made by the first line part TLa through the contact hole CH.

The link line LL, for other example, can be made of the first touch sensor metal TSM1 and the second touch sensor metal TSM2.

The touch line TL made by the first line part TLa on an area connected to the link line LL can be connected to the link line LL made of the first touch sensor metal TSM1. The touch line TL made by the second line part TLb on an area connected to the link line LL can be connected to the link line LL made of the second touch sensor metal TSM2.

Thus, such as a portion indicated by 1001, the contact hole CH for an electrical connection between the touch line TL and the link line LL may not be disposed.

Furthermore, the link line LL can be disposed as various structures according to a space or distance between the touch lines TL.

For example, in the case that the space between the touch lines TL is a normal level, the link line LL can be disposed such as an example illustrated in EX 1. In the case that the space between the touch lines TL is narrow, the link line LL can be disposed such as an example illustrated in EX 2. In the case that the space between the touch lines TL is wide, the link line LL can be disposed such as an example illustrated in EX 3.

In the case that the space between the touch lines TL is narrow, such as a portion indicated by 1002, the touch line TL or the link line LL can have a bent or curved structure.

Thus, even in a case that the space between the touch lines TL is narrow, the plurality of touch lines TL disposed in the display panel 110 can be implemented by a structure of the touch line TL of a double layer and the bent structure of the touch line TL or the link line LL.

According to various embodiments of the present disclosure, by a structure that the first line part TLa disposed on the first sensor layer and the second line part TLb disposed on the second sensor layer are alternated, a structure can be provided that at least a portion of different touch lines TL can be disposed to overlap to each other.

As the touch electrode TE crossing the touch line TL is disposed on an area where a layer constituting the touch line TL is changed, the mesh shape of the touch electrode TE can be implemented.

Thus, as maintaining a shape of the touch electrode TE for a touch sensing, and making it possible that more touch line TL is disposed while reducing or minimizing an area where the touch line TL is disposed, an arrangement structure of the touch line TL can be implemented while reducing or minimizing a reduction of the aperture ratio or the transmittance of the subpixel SP.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device, comprising:
   a plurality of subpixels, each subpixel having a light emitting area from which light is emitted and a transparent area adjacent to and in the same plane as the light emitting area and not overlapping the light emitting area;
   a plurality of touch electrodes; and
   a plurality of touch lines each of which is electrically coupled to each of the plurality of touch electrodes,
   wherein the each of the plurality of touch electrodes includes:
      a plurality of first electrode parts disposed on a first sensor layer; and
      a plurality of second electrode parts disposed on a second sensor layer which is different from the first sensor layer, and electrically coupled to at least one of the plurality of first electrode parts, and
   wherein each of the plurality of touch lines includes:
      a plurality of first line parts disposed on the first sensor layer; and
      a plurality of second line parts disposed on the second sensor layer, a portion of the plurality of second line parts overlaps at least one of the plurality of first electrode parts in a location positioned between the transparent area and the light emitting area of each subpixel, and the plurality of second line parts is electrically coupled between adjacent two first line parts of the plurality of first line parts.

2. The touch display device of claim 1, wherein the plurality of touch lines comprises a first touch line and a second touch line, and
wherein at least a portion of a first line part of the first touch line overlaps to a second line part of the second touch line, and at least a portion of a second line part of the first touch line overlaps to a first line part of the second touch line.

3. The touch display device of claim 2, wherein at least one of the plurality of first electrode parts is located between a first point where the first line part of the first touch line and the second line part of the first touch line are coupled to each other and a second point where the first line part of the second touch line and the second line part of the second touch line are coupled to each other.

4. The touch display device of claim 3, wherein the first line part of the first touch line and the first line part of the second touch line are separated from the first electrode part located between the first point and the second point.

5. The touch display device of claim 3, wherein the first line part of the first touch line or the first line part of the second touch line are coupled to the first electrode part located between the first point and the second point.

6. The touch display device of claim 3, wherein the first electrode part located between the first point and the second point is electrically coupled to at least one of the plurality of second electrode parts on an area other than an area between the first point and the second point.

7. A touch display device, comprising:
a plurality of touch electrodes; and
a plurality of touch lines each of which is electrically coupled to each of the plurality of touch electrodes,
wherein the each of the plurality of touch electrodes includes:
a plurality of first electrode parts disposed on a first sensor layer; and
a plurality of second electrode parts disposed on a second sensor layer which is different from the first sensor layer, and electrically coupled to at least one of the plurality of first electrode parts, and
wherein each of the plurality of touch lines includes:
a plurality of first line parts disposed on the first sensor layer; and
a plurality of second line parts disposed on the second sensor layer, a portion of the plurality of second line parts overlaps to at least one of the plurality of first electrode parts, and the plurality of second line parts is electrically coupled between adjacent two first line parts of the plurality of first line parts,
wherein a length of each of the plurality of second line parts is greater than a length of each of the plurality of first line parts.

8. The touch display device of claim 1, wherein the plurality of first line parts and the plurality of second line parts included in the each of the plurality of touch lines are disposed alternatively along a direction which the plurality of touch lines is disposed.

9. The touch display device of claim 1, wherein the plurality of touch lines and the plurality of second electrode parts are disposed alternatively along a direction crossing a direction which the plurality of touch lines is disposed.

10. The touch display device of claim 1, wherein at least one of the plurality of first electrode parts crosses the plurality of touch lines.

11. The touch display device of claim 1, wherein at least one of the plurality of first electrode parts is disposed along a direction crossing a direction which the plurality of touch lines is disposed, and is disposed on an area other than an area overlapped to the plurality of touch lines.

12. The touch display device of claim 1, wherein at least one of the plurality of second electrode parts overlaps to a portion of a first electrode part disposed along a direction crossing a direction which the plurality of second electrode parts is disposed, is separated from the first electrode part overlapped, and is electrically coupled to a first electrode part disposed along the direction which the plurality of second electrode parts is disposed.

13. The touch display device of claim 2, further comprising:
a first link line disposed on the first sensor layer and electrically coupled to the first touch line; and
a second link line disposed on the second sensor layer and electrically coupled to the second touch line.

14. A touch display device, comprising:
a plurality of subpixels, each subpixel having a light emitting portion from which light is emitted and a transparent portion adjacent to and in the same plane as the light emitting portion and not overlapping the light emitting portion;
a plurality of touch electrodes; and
a plurality of touch lines each of which is electrically coupled to each of the plurality of touch electrodes,
wherein each of the plurality of touch lines includes:
a plurality of first line parts disposed on a first sensor layer; and
a plurality of second line parts disposed on a second sensor layer which is different from the first sensor layer, and electrically coupled between adjacent two first line parts of the plurality of first line parts, a portion of the plurality of second line parts overlapping with at least one of the plurality of first line parts in a location positioned between the transparent portion and the light emitting portion of each subpixel.

15. The touch display device of claim 14, wherein at least a portion of a first line part included in any one of the plurality of touch lines overlaps to a second line part included in other one of the plurality touch lines.

16. The touch display device of claim 14, wherein a length of each of the plurality of second line parts is greater than a length of each of the plurality of first line parts.

17. The touch display device of claim 14, wherein the plurality of first line parts is disposed on an area other than an area overlapped to the plurality of touch electrodes, and a portion of each of the plurality of second line parts overlaps to at least one of the plurality of touch electrodes.

18. A touch display device, comprising:
a plurality of subpixels, each subpixel having a light emitting portion from which light is emitted and a transparent portion adjacent to and in the same plane as the light emitting portion and not overlapping the light emitting portion of the respective subpixel;
a plurality of touch electrodes;
a first touch line electrically coupled to a first touch electrode of the plurality of touch electrodes, the first touch line being positioned on a first sensor layer and
a second touch line electrically coupled to a second touch electrode of the plurality of touch electrodes, the second touch line being positioned on a second sensor layer that is spaced from the first sensor layer,
wherein a portion of the first touch line overlaps with a portion of the second touch line at a location between the transparent portion and a light emitting portion of a subpixel.

19. The touch display device of claim 18 further including:
a black matrix member positioned to overlap the location at which the first touch line overlaps the second touch line.

\* \* \* \* \*